US012088604B2

United States Patent
Bakshi et al.

(10) Patent No.: US 12,088,604 B2
(45) Date of Patent: Sep. 10, 2024

(54) SECURITY SYSTEM FOR DYNAMIC DETECTION OF ATTEMPTED SECURITY BREACHES USING ARTIFICIAL INTELLIGENCE, MACHINE LEARNING, AND A MIXED REALITY GRAPHICAL INTERFACE

(71) Applicant: BANK OF AMERICA CORPORATION, Charlotte, NC (US)

(72) Inventors: Sakshi Bakshi, New Delhi (IN); Durga Prasad Kutthumolu, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 333 days.

(21) Appl. No.: 17/740,697

(22) Filed: May 10, 2022

(65) Prior Publication Data

US 2023/0370476 A1 Nov. 16, 2023

(51) Int. Cl.
*H04L 9/40* (2022.01)

(52) U.S. Cl.
CPC ...... *H04L 63/1416* (2013.01); *H04L 63/1425* (2013.01); *H04L 63/1433* (2013.01); *H04L 63/145* (2013.01); *H04L 63/20* (2013.01)

(58) Field of Classification Search
CPC ............. H04L 63/1416; H04L 63/1425; H04L 63/1433; H04L 63/145; H04L 63/20
See application file for complete search history.

(56) References Cited

U.S. PATENT DOCUMENTS

| | | |
|---|---|---|
| 8,881,288 B1 | 11/2014 | Levy et al. |
| 9,930,059 B1 | 3/2018 | Helmsen et al. |
| 10,121,000 B1 | 11/2018 | Rivlin et al. |
| 10,476,896 B2 | 11/2019 | Divalentin et al. |
| 10,581,881 B2 | 3/2020 | Muddu et al. |
| 10,630,716 B1 | 4/2020 | Ghosh et al. |
| 10,911,468 B2 | 2/2021 | Muddu et al. |
| 10,986,106 B2 | 4/2021 | Muddu et al. |
| 11,201,890 B1 | 12/2021 | Coull et al. |
| 11,943,235 B2 * | 3/2024 | Wahbo ..................... H04L 63/08 |
| 11,973,782 B2 * | 4/2024 | Chen ...................... H04L 63/102 |
| 2015/0032846 A1 | 1/2015 | Doken et al. |
| 2016/0248804 A1 | 8/2016 | Abuelsaad et al. |
| 2017/0126712 A1 | 5/2017 | Crabtree et al. |
| 2018/0063175 A1 * | 3/2018 | Kandala ................ H04L 63/145 |
| 2019/0260782 A1 | 8/2019 | Humphrey et al. |
| 2019/0260794 A1 | 8/2019 | Woodford et al. |
| 2020/0296124 A1 * | 9/2020 | Pratt ....................... H04L 63/20 |
| 2021/0078735 A1 | 3/2021 | Kapp et al. |
| 2021/0273961 A1 * | 9/2021 | Humphrey .......... H04L 63/1425 |
| 2022/0014554 A1 * | 1/2022 | Vasu ..................... H04L 63/102 |
| 2023/0007023 A1 * | 1/2023 | Andrabi .............. H04L 63/1425 |
| 2023/0300156 A1 * | 9/2023 | Karpovsky ......... H04L 63/0236 726/22 |

* cited by examiner

*Primary Examiner* — Aftab N. Khan
(74) *Attorney, Agent, or Firm* — Moore & Van Allen PLLC; Jeffrey R. Gray

(57) ABSTRACT

A security system environment that uses artificial intelligence (AI) and machine learning (ML) (collectively "AI/ML") to provide dynamic detection of potential security breaches and a mixed realty interface to decision the potential security breaches.

18 Claims, 5 Drawing Sheets

SECURITY SYSTEM FOR DYNAMIC DETECTION OF ATTEMPTED SECURITY BREACHES USING ARTIFICIAL INTELLIGENCE, MACHINE LEARNING, AND A MIXED REALITY GRAPHICAL INTERFACE

FIELD

The present disclosure relates to a security system for the dynamic detection of potential security breaches, and in particular using artificial intelligence and machine learning in order to identify the potential security breaches and using a mixed reality interface to decision the potential security breaches.

BACKGROUND

Traditional security systems face increasing challenges in detecting and dealing with potential security breaches since attempted cybersecurity breaches have become more frequent and severe over time as automation and digitization has increased within organizations. There exists a need for providing a more efficient cybersecurity systems.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The present disclosures relates to a security system environment that uses artificial intelligence (AI) and machine learning (ML) (collectively "AI/ML") to provide dynamic detection of potential security breaches and a mixed realty interface to decision the potential security breaches.

One embodiment of the present disclosure is a security system for dynamic detection of potential security breaches. The security system comprises one or more memory devices with computer-readable program code stored thereon, and one or more processing devices operatively coupled to the one or more memory devices. The one or more processing devices are configured to execute the computer-readable program code to receive a plurality of interaction requests from a plurality of entities, authenticate the plurality of interaction requests, and process authenticated interactions from the plurality of interaction requests when the authentication fails to detect anomalies in the plurality of interaction requests. The one or more processing devices are further configured to execute the computer-readable program code to identify an abnormal interaction request from the plurality of interaction requests when the authentication identifies an anomaly, and analyze the abnormal interaction request as a potential security breach based on a catalog of a plurality of stored abnormal interaction requests. The one or more processing devices of the security system are further configured to execute the computer-readable program code to generate interaction ontology for the abnormal interaction request, wherein the interaction ontology comprises a map of nodes for the potential security breach, identify a policy for the interaction ontology, generate a graphical interaction ontology from the interaction ontology and the policy, and display the graphical interaction ontology to one or more users.

In further accord with embodiments, the authentication of the plurality of interaction requests utilize cryptographic techniques that identify corrupted metadata, digital files, or validation protocols.

In other embodiments, the authentication of the plurality of interaction requests is based on using a ring signature for each of the plurality interaction requests that is determined from the plurality of entities and interaction information for each of the plurality of interaction requests.

In still other embodiments, the anomaly is an unauthorized ring signature that is a fake ring signature or has a compromised signature protocol.

In yet other embodiments, analyzing the abnormal interaction request for the potential security breach based on the catalog of the plurality of stored abnormal interaction requests is performed using artificial intelligence and machine learning of the plurality of stored abnormal interaction requests.

In other embodiments, the catalog of the plurality of stored abnormal interaction requests includes historical interaction information for the plurality of stored abnormal interaction requests and decisioning actions for the policy for the plurality of stored abnormal interaction requests.

In further accord with embodiments, the map of nodes comprises one or more centralized nodes, one or more immersive nodes linked to the one or more centralized nodes, one or more policy nodes linked to the one or more immersive nodes, and one or more action nodes linked to the one or more immersive nodes.

In other embodiments the one or more centralized nodes comprise one or more entities or digital property for the abnormal interaction request.

In yet other embodiments, the one or more immersive nodes comprise proposed actions for the one or more centralized nodes.

In still other embodiments, the one or more policy nodes comprise a response to the potential security breach.

In other embodiments, the one or more actionable nodes provide decisioning for the potential security breach.

In further accord with embodiments, displaying the graphical interaction ontology to the one or more users comprising displaying the graphical interaction ontology in a mixed reality interface.

In other embodiments, the mixed reality interface is enabled through edge gateways.

In still other embodiments, the mixed reality interface allows for connection of multiple internet of things devices of multiple users to allow the multiple users to decision the potential security breach in parallel.

Another embodiment of the invention is a computer-implemented method for dynamic detection of potential security breaches using one or more processors. The computer-implemented method comprises receiving a plurality of interaction requests from a plurality of entities, authenticating the plurality of interaction requests, and processing authenticated interactions from the plurality of interaction requests when the authentication fails to detect anomalies in the plurality of interaction requests. The computer-implemented method further comprises identifying an abnormal interaction request from the plurality of interaction requests when the authentication identifies an anomaly, analyzing the abnormal interaction request as a potential security breach based on a catalog of a plurality of stored abnormal interaction requests, and generating interaction ontology for the abnormal interaction request, wherein the interaction ontology comprises a map of nodes for the potential security breach. The computer-implemented method further comprises identifying a policy for the interaction ontology, generating a graphical interaction ontology from the interaction ontology and the policy, and displaying the graphical interaction ontology to one or more users.

In further accord with embodiments, the authentication of the plurality of interaction requests is based on using a ring signature for each of the plurality of interaction requests that is determined from the plurality of entities and interaction information for each of the plurality of interaction requests.

In other embodiments, the anomaly is an unauthorized ring signature that is a fake ring signature or has a compromised signature protocol.

In still other embodiments, the map of nodes comprises one or more centralized nodes, one or more immersive nodes linked to the one or more centralized nodes, one or more policy nodes linked to the one or more immersive nodes, and one or more action nodes linked to the one or more immersive nodes.

In other embodiments, displaying the graphical interaction ontology to one or more users comprising displaying the graphical interaction ontology in a mixed reality interface.

Another embodiment of the present disclosure is a computer program product for dynamic detection of potential security breaches. The computer program product comprises at least one non-transitory computer-readable medium having computer-readable program code portions embodied therein. The computer-readable program code portions comprise executable portions configured to receive a plurality of interaction requests from a plurality of entities, to authenticate the plurality of interaction requests; and to process authenticated interactions from the plurality of interaction requests when the authentication fails to detect anomalies in the plurality of interaction requests. The computer-readable program code portions further comprise executable portions configured to identify an abnormal interaction request from the plurality of interaction requests when the authentication identifies an anomaly, to analyze the abnormal interaction request as a potential security breach based on a catalog of a plurality of stored abnormal interaction requests, and to generate interaction ontology for the abnormal interaction request, wherein the interaction ontology comprises a map of nodes for the potential security breach. The computer-readable program code portion further comprise executable portions configured to identify a policy for the interaction ontology, to generate a graphical interaction ontology from the interaction ontology and the policy, and to display the graphical interaction ontology to one or more users.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
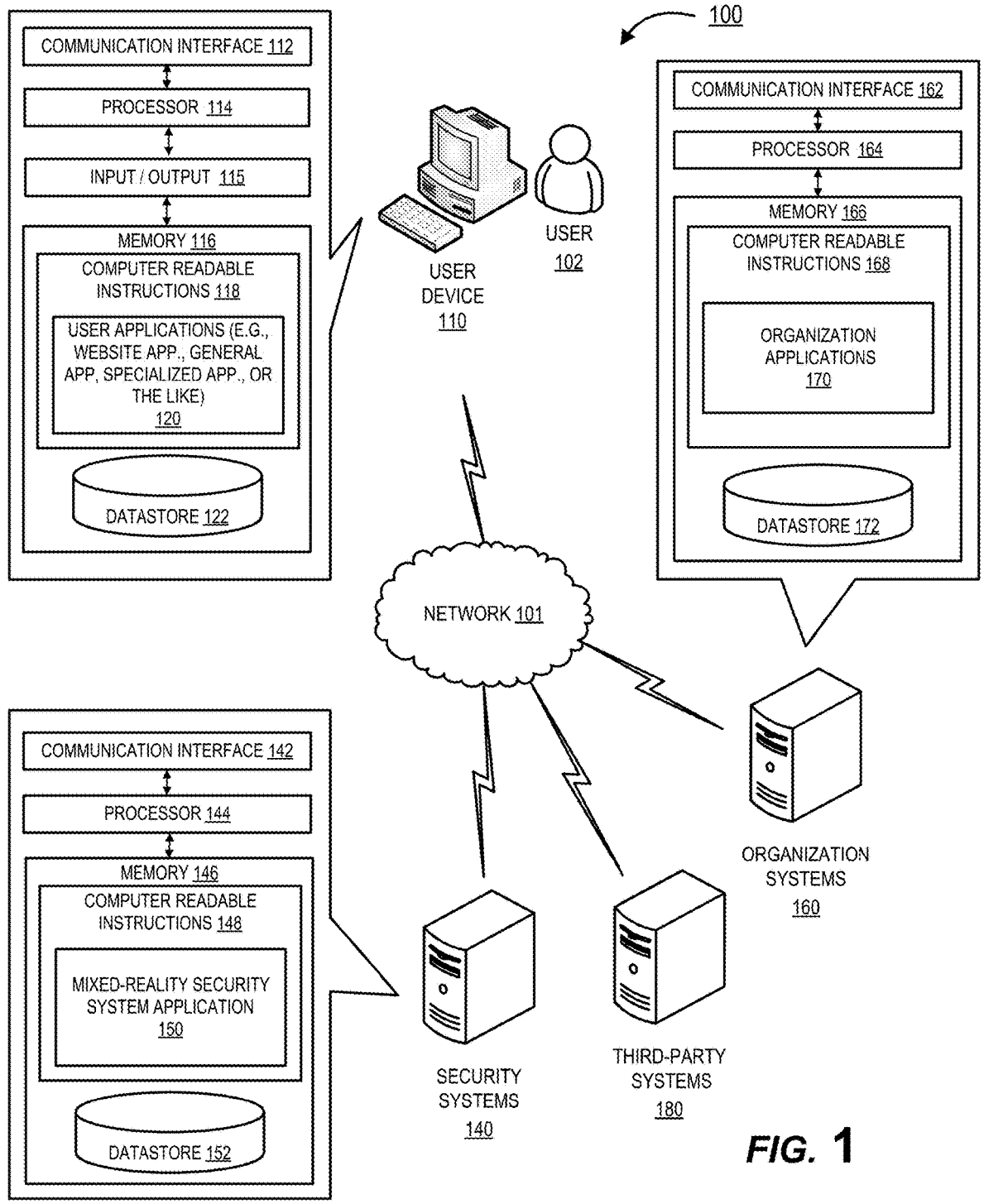

Having thus described embodiments of the invention in general terms, reference will now be made to the accompanying drawings, wherein:

FIG. 1 provides a security system environment, in accordance with some embodiments of the present disclosure.

Figure 2:
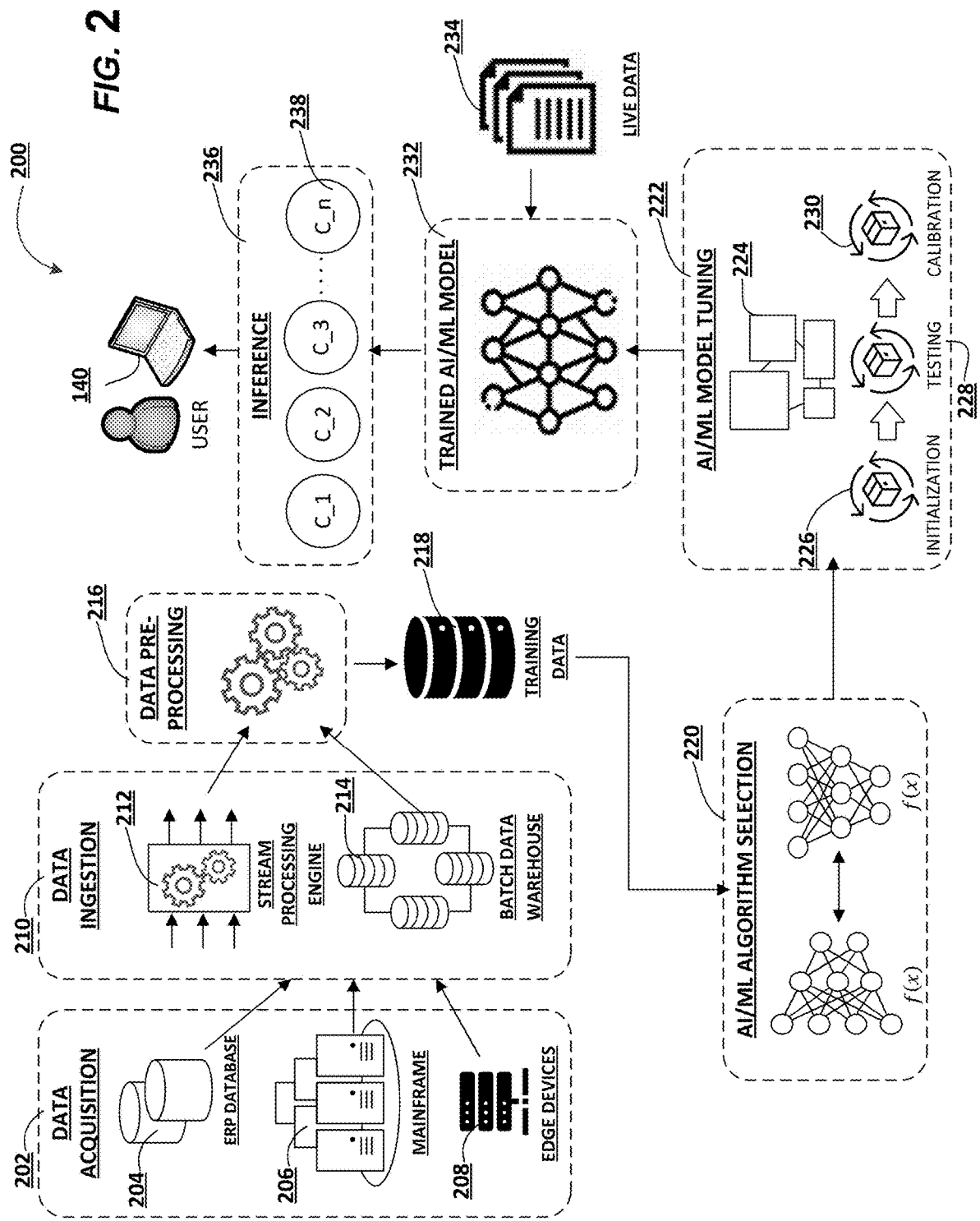

FIG. 2 provides an artificial intelligence (AI) and machine learning (ML) subsystem architecture, in accordance with some embodiments of the present disclosure.

Figure 3:
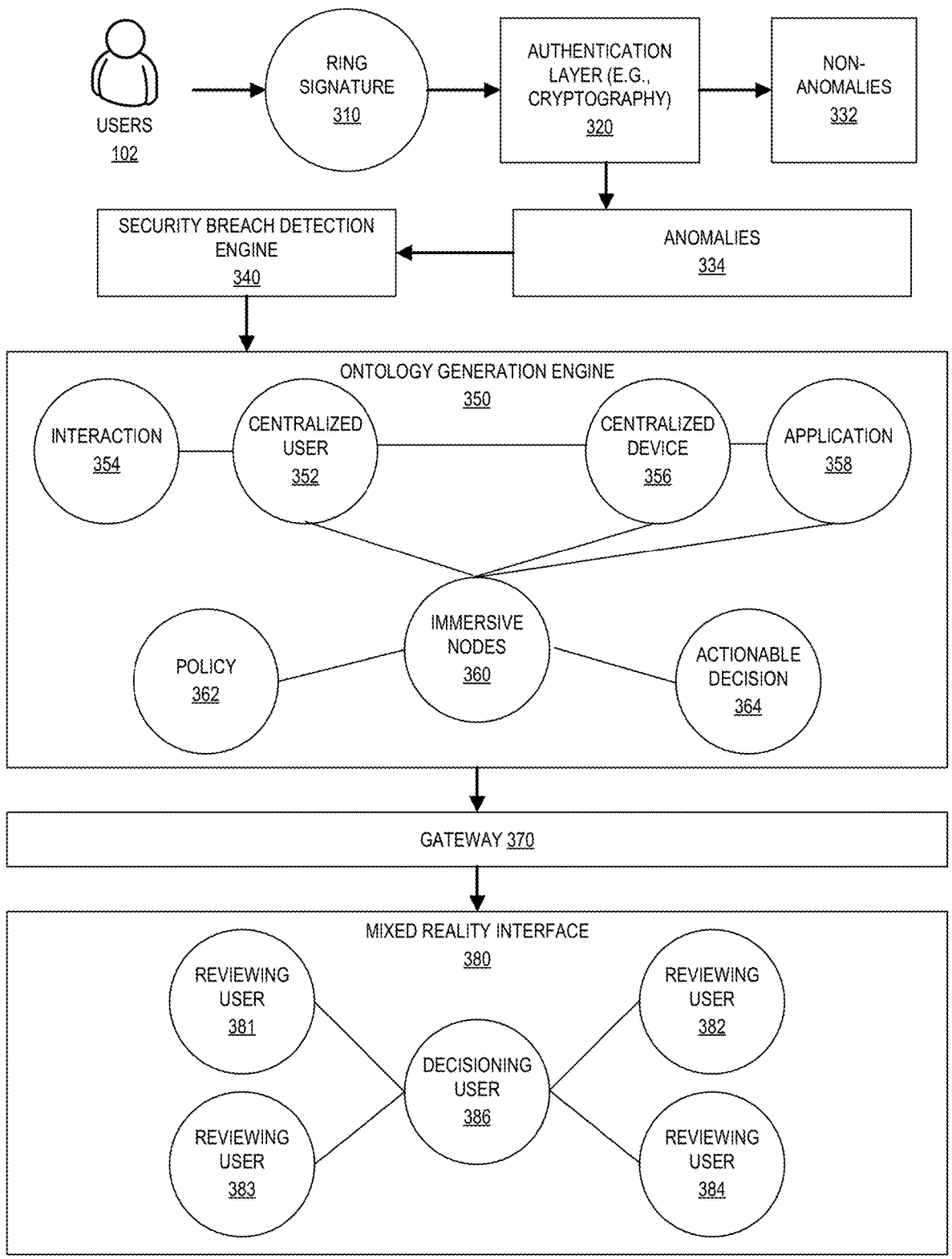

FIG. 3 provides schematic process flow for identifying and actioning interaction anomalies within the mixed reality graphical interface, in accordance with some embodiments of the present disclosure.

Figure 4:
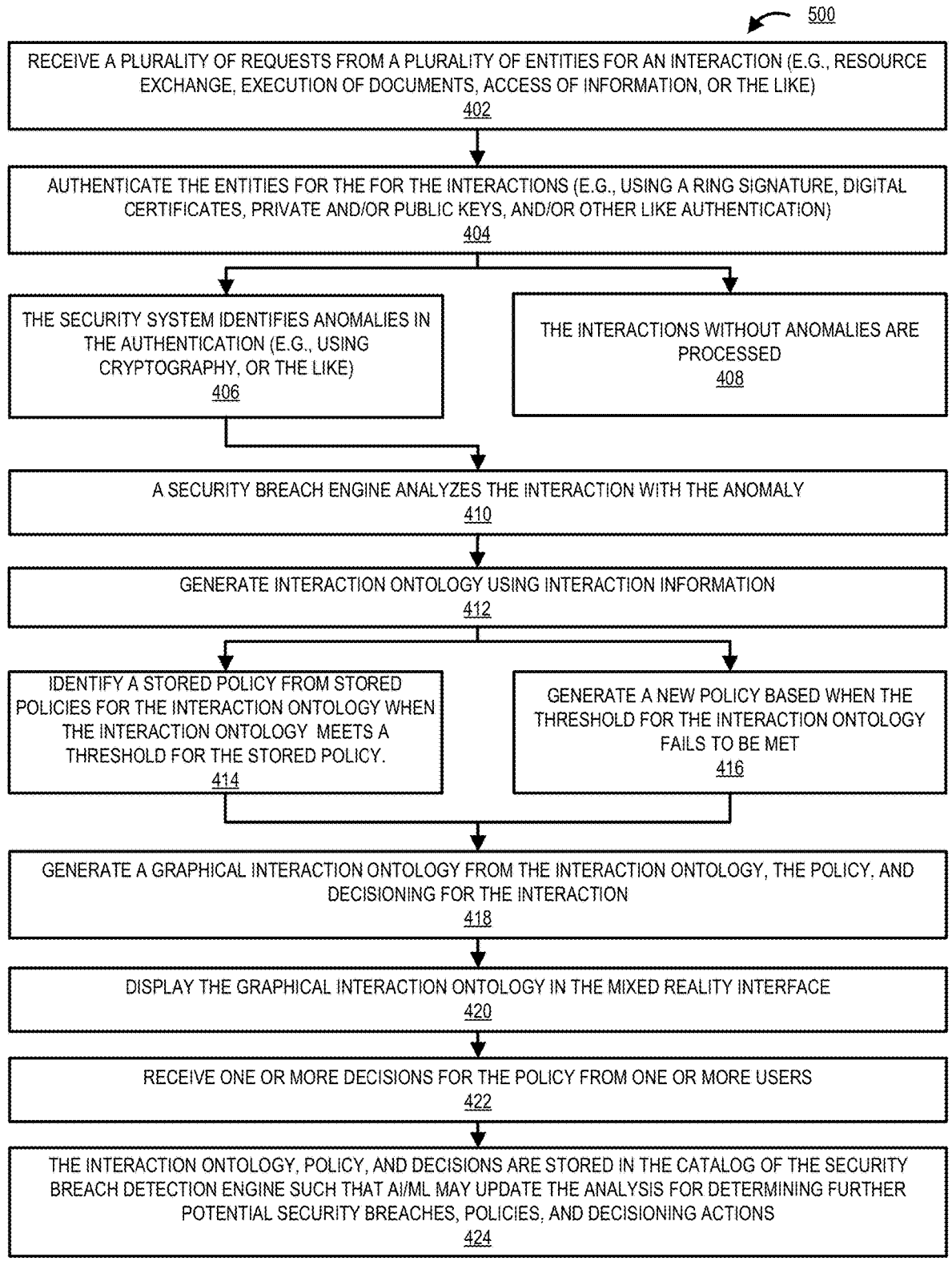
Figure 5:
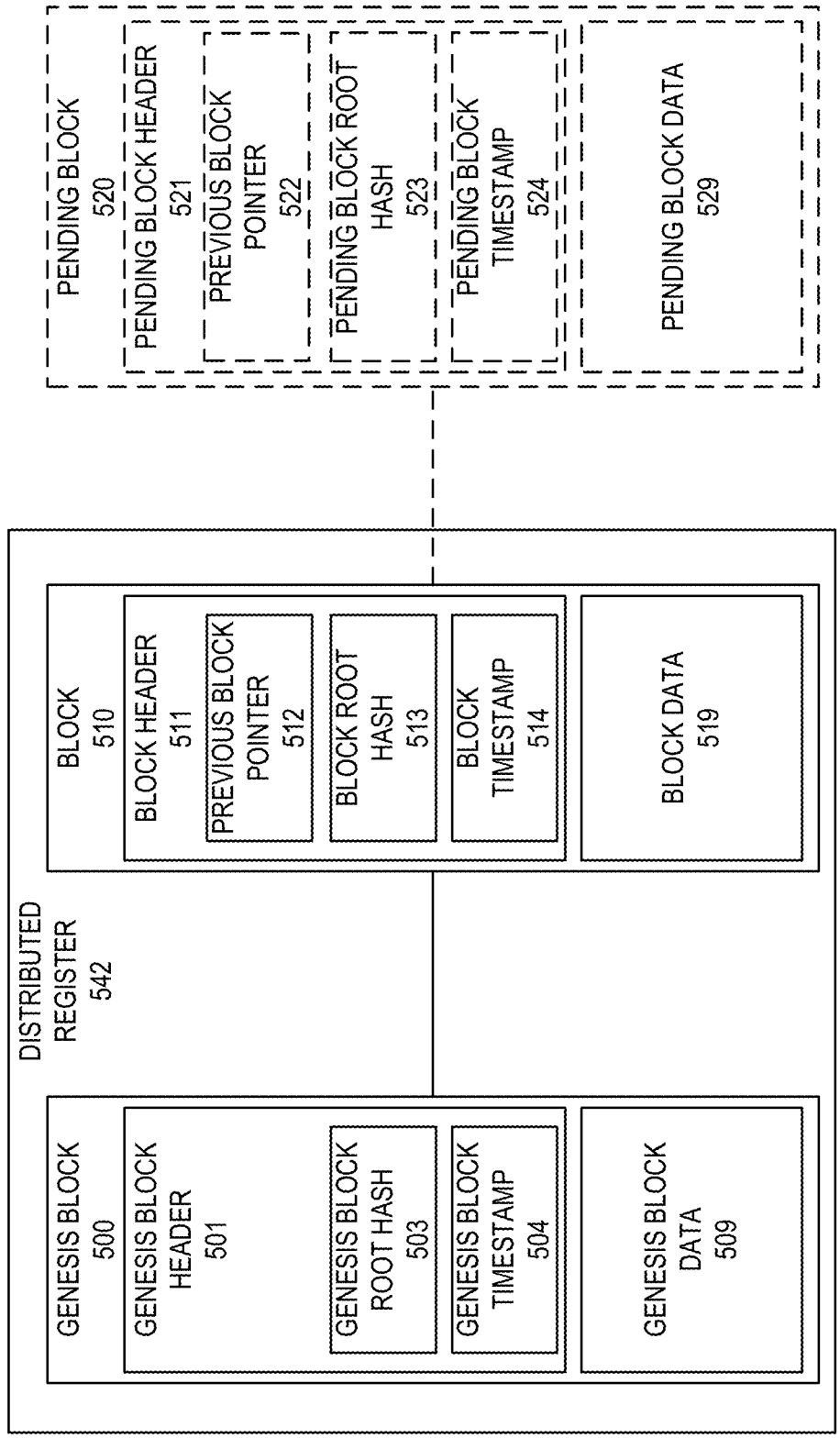

FIG. 4 illustrates a block diagram illustrating the data structures within a distributed register, in accordance with one embodiment of the present disclosure; and FIG. 5 illustrates a process flow for identifying and decisioning interaction anomalies using the security system, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

FIG. 1 provides a security system environment that uses AI/ML to provide dynamic detection of potential security breaches and a mixed realty interface to decision the potential security breaches. The security system environment includes specialized systems and devices communicably linked across a network to perform the functions of implementing the cyber security features for the interactions that occur over the network. FIG. 1 provides a security system environment 100, in accordance with some embodiments of the present disclosure. As illustrated in FIG. 1, the security system(s) 140 (e.g., operated by the organization, third-parties, or the like) are operatively coupled, via a network 101 to the user device 110, the one or more organization systems 160, and/or the one or more third-party systems 180. In this way, the security system(s) 140 can send information to, and receive information from, the user device 110, the organization systems 160, and/or the third-party systems 180. FIG. 1 illustrates only one example of some embodiments of the security system environment 100, and it will be appreciated that in other embodiments one or more of the systems, devices, or servers may be combined into a single system, device, or server, or be made up of multiple systems, devices, or servers.

In accordance with embodiments of the invention, the term "entity" may be used instead of "user", "party" (e.g., third party), "organization", or the like, or vice versa. As such, it should be understood that while the embodiments described herein discuss interactions between users, parties, entities, organizations, and/or each other, it should be understood that the interactions may be described as occurring between entities (e.g., a first entity, second entity, or the like). Consequently, the term "entity" may include any user 102 acting on the user's own behalf, any party (e.g., organization, company, third-party or the like) acing on its own behalf, or any user 102 acting on behalf of any party. An "organization" may refer to a business, company, or the like that maintains or operates the system or a portion thereof, including allowing for the exchange of resources between the various entities described herein.

The network 101 may be a system specific network receiving and distributing specific network feeds and identifying specific network associated triggers. The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the entity (e.g., a user 102) utilizes an entity device (e.g., a user device 110) to implement, access, and/or respond to the interaction processing over the network 101, such as by initiating, implementing, decisioning (e.g., approving, denying, or the like) monitoring, and/or the like an interaction (e.g., resource exchanges, information sharing, smart contracts, or the like). In some embodiments, the entity (e.g., a user 102, party, or the like) is completing an interaction leveraging the security systems 140.

In some embodiments, the user 102 has a user device 110, such as a mobile device (e.g., a mobile phone, smart phone, tablet, wearable device, or the like) that may interact with a device 110 of another user 102 and/or the systems and devices described herein to allow for one or more users 102 to view interaction anomalies, policies, and/or decision the interaction anomalies within a mixed reality graphical interface, as will be described in further detail herein. In some embodiments, the user 102 may be a computing device user, a phone user, a mobile device application user, a wearable device user, a customer (e.g., a resource pool holder, a person who has a resource pool, a person accessing information, or the like person), a system operator, database manager, a support technician, and/or employee of an entity. In some embodiments, identities of an individual may include online handles, usernames, identification numbers (e.g., Internet protocol (IP) addresses), aliases, family names, maiden names, nicknames, or the like.

As used herein, the term "user device" may refer to any device that employs a processor and memory and can perform computing functions, such as a personal computer or a mobile device, wherein a mobile device is any mobile communication device, such as a cellular telecommunications device (e.g., a cell phone or mobile phone), personal digital assistant (PDA), a mobile Internet accessing device, smartphone, or other mobile device. Other types of mobile devices may include pagers, wearable devices (e.g., augmented reality headsets, virtuality reality headsets, or the like that allow for accessing a mixed reality interface), mobile televisions, entertainment devices, laptop computers, cameras, video recorders, audio/video player, radio, global positioning system (GPS) devices, or any combination of the aforementioned. In some embodiments, a device may refer to any computer system, platform, server, database, networked device, or the like. The device may be used by the user 102 to access the system(s) directly or through an application, online portal, internet browser, virtual private network, or other connection channel. The device may be a computer device within a network of connected computer devices that share one or more network storage locations.

It is understood that the servers, systems, and devices described herein illustrate some embodiments of the present disclosure. It is further understood that one or more of the servers, systems, and devices can be combined in other embodiments and still function in the same or similar way as the embodiments described herein.

As illustrated in FIG. 1, the user device 110 may generally include a processing device or processor 114 communicably coupled to devices such as, a memory device 116, user input/output devices 115 (e.g., a user display device, a microphone, keypad, touchpad, touch screen, camera, video recorder, or the like), a communication device or network interface device 112, a power source, a clock or other timer, a positioning system device, such as a geo-positioning system device like a GPS device or the like and the like. The processing device 114 may further include a central processing unit, input/output (I/O) port controllers, a graphics controller or GPU, a serial bus controller and a memory and local bus controller.

As used herein, the term "processing device" or "processor" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processor 114 may include functionality to operate one or more software programs or applications, which may be stored in the memory 116. For example, the processor 114 may be capable of operating applications, such as the user application 120. The user application 120 may be configured to allow the user device 110 to transmit and receive data and instructions from the other devices and systems. The user device 110 comprises computer-readable instructions 118 and data storage 122 stored in the memory device 116, which in some embodiments include the computer-readable instructions 118 of a user application 120. In some embodiments, the user application 120 allows a user 102 to access and/or interact with the security system 140 and/or other users with a mixed reality interface through the security system 140. The user application 120 may further include features for analyzing and/or decisioning interactions through the mixed reality interface by allowing the user 102 to manage and view detailed information related to a plurality of past and/or pending interactions.

The processor 114 may be configured to use the communication interface 112 to communicate with one or more other devices on a network 101 such as, but not limited to the security system 140, the organization systems 160, and/or the third-party systems 180. In this regard, the communication interface 112 may include an antenna operatively coupled to a transmitter and a receiver (together a "transceiver"), modem. The processor 114 may be configured to provide signals to and receive signals from the transmitter and receiver, respectively. The signals may include signaling information in accordance with the air interface standard of the applicable BLE standard, cellular system of the wireless telephone network and the like, that may be part of the network 101. In this regard, the user device 110 may be configured to operate with one or more air interface standards, communication protocols, modulation types, and access types. By way of illustration, the user device 110 may be configured to operate in accordance with any of a number of first, second, third, fourth, and/or fifth-generation communication protocols and/or the like. For example, the user device 110 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G), fifth-generation (5G), sixth-generation (6G) wireless communication protocols, web3.0 protocols, internet of things, or the like. The user device 110 may also be configured to operate in accordance with non-cellular communication mechanisms, such as via a wireless local area network (WLAN) or other communication/data networks. The user device 110 may also be configured to operate in accordance Bluetooth® low energy, audio frequency, ultrasound frequency, or other communication/data networks.

The user device 110 may also include a memory buffer, cache memory or temporary memory device operatively coupled to the processor 114. Typically, one or more applications 120 are loaded into the temporary memory during use. As used herein, memory may include any computer readable medium configured to store data, code, or other information. The memory 116 may include volatile memory, such as volatile Random-Access Memory (RAM) including a cache area for the temporary storage of data. The memory 116 may also include non-volatile memory, which can be embedded and/or may be removable. The non-volatile memory may additionally or alternatively include an electrically erasable programmable read-only memory (EEPROM), flash memory or the like.

FIG. 1 further provides a block diagram of the security systems 140, in accordance with embodiments of the invention. The security systems 140 generally comprise a communication interface 142, a processor 144, and a memory 146. The processor 144 is operatively coupled to the communication interface 142 and the memory 146. The processor 144 uses the communication interface 142 to communicate with the network 101 and other devices on the network 101, such as, but not limited to the user devices 110, the organization systems 160, and/or the third-party systems 180. As such, the communication interface 142 generally comprises a modem, server, transceiver, or other device for communicating with other devices on the network 101.

The security systems 140 comprises computer-readable instructions 148 stored in the memory 146, which in some embodiments include the computer-readable instructions 148 of security system applications(s) 150 that provides AI/ML for detecting potential security breaches and/or a mixed-reality interface that improves the decisioning for the potential security breaches. In some embodiments, the memory 146 includes data storage 152 for storing data created and/or used by the security system 150. In some embodiments, the datastore or data storage 152 of the security system 150 may store a record of one or more interactions (e.g., transactions, access to information, ontology related to interactions, polices used for the interactions, decisioning for the interactions, and/or the like).

Embodiments of the security system(s) 140, as will be described herein, may include multiple systems, servers, computers or the like maintained by one or many organizations. FIG. 1 merely illustrates security systems 140 that, typically, interact with many other similar systems, such as the user devices 110, the organization systems 160, and/or third-party systems 180, to analyze interactions, determine interaction anomalies, create ontology for the interactions, identify potential security breaches, and/or decision the interactions and/or the potential security breaches (e.g., in real-time, or the like) using AL/ML and/or a mixed-reality interface. In some embodiments, the security system 140, or portions thereof, may be part of an organization system 160, third-party system 180, or vice versa. The security systems 140 may communicate with the user devices 110, organization systems 160, and/or third-party systems 180 via a secure connection generated for secure encrypted communications between the systems.

In some embodiments of the security systems 140, the memory 146 stores AI/ML security breach detection and/or mixed-reality application(s) 150. In some embodiments of the present disclosure, AI/ML security breach detection and/or mixed-reality application(s) 150 may include applications having computer-executable program code that instructs the processor 144 to operate the network communication interface 142 to perform certain functions described herein. In some embodiments, the AI/ML security breach detection and/or mixed-reality application(s) 150 may also instruct the processor 144 to perform certain logic, data processing, and data storing functions of the application.

The processor 144 is configured to use the communication interface 142 to gather data, such as data corresponding to interactions from various data sources such as the user devices 110, organization systems 160, and/or third-party systems 180. The processor 144 stores the data that it receives in the memory 146. The memory 146 may further comprise stored interaction history, policies, interaction ontology, or the like that aids in the decisioning of interactions with anomalies that are identified as including potential security breaches, as will be described in further detail herein.

It should be understood that the security system 140 may comprise of one or more systems that provide the functions described herein. In particular, the security systems 140 may comprise an authentication system used to identify users 102 (e.g., customers, misappropriators, or the like) trying to access the organization systems 180 using an interaction. The authentication system may include the use of a ring signature that is used to identify the users 102 involved in the interaction. The security system 140 may further include a cryptography system that utilizes cryptography to identify if a requested interaction from a user (e.g., customer, or the like) trying to access the organization system includes interaction anomalies. Moreover, the security system 140 may include a security breach detection engine that may use artificial intelligence (AI) and/or machine learning (ML) (collectively "AI/ML") to detect patterns in interactions (e.g., types, users, systems, or the like) that indicate potential security threats. The patterns may be based on historical interactions, anomalies that did or did not result in security breaches, users, systems, products (e.g., goods or services), or the like that are used to train AI/ML of the security breach detection system to predict future anomalies, as will be discussed in further detail herein. The security system 140 may further include an ontology generation engine that categorizes the components of the interaction and the relationship between the components, and a mixed-reality system that displays the ontology of the interaction to the users in a mixed reality interface and allows the users to decision the potential security breaches, which will be described in further detail herein.

FIG. 1 further provides a block diagram of one or more organization systems 160, in accordance with embodiments of the invention. In some embodiments, the organization systems 160 may refer to the systems of organizations that misappropriators may be trying to access. The organization systems 160 generally comprise a communication interface 162, a processor 164, and a memory 166. The processor 164 is operatively coupled to the communication interface 162 and the memory 166. The processor 164 uses the communication interface 162 to communicate with the network 101 and other devices on the network 101, such as, but not limited to the user devices 110, the security systems 140, and/or the third-party systems 180. As such, the communication interface 162 generally comprises a modem, server, transceiver, or other device for communicating with other devices on the network 101.

The organization systems 160 further comprise computer-readable instructions 168 stored in the memory 166, which in some embodiments include the computer-readable instructions 168 of organization applications 170. In some embodiments, the memory device 166 includes data storage 172 for storing data created and/or used by the organization systems 160, the user devices 110, or the security systems 140.

Embodiments of the organization systems 160 may include multiple systems, servers, computers or the like maintained by one or many organizations. In some embodiments, the security systems 140 may or may not be distinct from the organization systems 160. The organization systems 160 may communicate with the security systems 140 via secure connections generated for secure encrypted communications between the systems.

In some embodiments of the organization systems 160, the memory 166 stores organization applications 170. In some embodiments, the memory 166 stores data including, but not limited to, interaction information, resource pool information, customer information, or other confidential information, which misappropriators may try to access. In some embodiment of the disclosure, the organization applications 170 may associate with applications having computer-executable program code that instructs the processor 164 to operate the network interface 162 to perform certain communication functions described herein. In some embodiments, the computer-executable program code of the organization applications 170 may also instruct the processor 164 to perform certain logic, data processing, and data storing functions of the application.

The one or more third party systems 180 may comprise the systems that a third party uses to enter into interactions with users 102, may comprise the systems that a third party uses to provide services to the organization, or the like. The third-party systems 180 may have components that are the same as or similar to the user devices 110, the security systems 140, and/or the organization systems 160 (e.g., communication interfaces, processors, memories, datastore, or the like as described above).

FIG. 2 illustrates an exemplary AI/ML subsystem architecture 200 which may be a part of the security system 140 and/or work with the security system 140, in accordance with embodiments of the present invention. The AI/ML subsystem architecture 200 may be utilized along with historical attempted security breaches, interactions, user information, post decisioning, policy, ontology associated therewith, or the like in order to train the AI/ML subsystem to dynamically identify when new interactions are potential security breaches, generate ontology for the potential security breaches, and utilize a mixed reality interface to decision the new interactions, as will be described in further detail with respect to FIG. 3.

The AI/ML subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), such as, computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AL/ML model tuning engine 222 may be used to train a machine learning model 224 using the training data 218 to make predictions or decisions without explicitly being programmed to do so. The AL/ML model 224 represents what was learned by the selected AL/ML algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomizer 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the AI/ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the AL/ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained AI/ML model 232, similar to any other software application output, can be persisted to storage, file, memory, or application, or looped back into the processing component to be reprocessed. More often, the trained AI/ML model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrate a schematic for the operation of the security system environment 100. Moreover, FIG. 4 illustrates a process flow for the operation of the security system 100. As illustrated in FIG. 3 and in block 402 of FIG. 4, user(s) 102 (e.g., customers or the like) may request interaction(s). For example, the user(s) 102 may request to access a database, may request access to resources (e.g., withdrawal of funds from a resource account, for a loan, other transaction, or the like), may request to access user information, request to enter into an interaction with an entity (e.g., for a product—good or service—from a merchant, or the like), or request another type of interaction. The user(s) 102 may submit a request for the interaction by using the user device 110 to access the organization systems 160.

As illustrated in block 404 of FIG. 4, it should be understood that the security systems(s) 140 may authenticate the user 102 for the interaction, as previously described herein. The authentication process may include creating a ring signature 310 for the user 102 utilizing one or more of the interaction information (e.g., time of request, location of request, good involved in the request, party making the request, or the like), digital properties (e.g., applications, documents, files, videos, audio, spreadsheets, operating systems, devices, device configurations, digital certificates, decentralized blockchain information, or anything else that is stored digitally) involved in the interaction, or the like. It should be understood that the ring signature 310 may be a digital signature based on keys (e.g., public keys, private keys, or the like) of the parties involved in the interaction, the interaction information, the digital properties, or the like. It should be understood that the ring signatures 310 may utilize asymmetric encryption (e.g., based on 32 bit hexadecimal hash values, or the like). The ring signature 310 may be generated by calculating a key using a cryptographic hash function, using a random glue value, using a random variable for all ring members except the generator and calculate a corresponding function, solve the ring function, calculate the random variable using a certificate signer's private key, and utilizing the public keys of the entities involved for the ring signature.

A ring network may be utilized to manage the digital properties, and as such, the digital properties may be secured within a blockchain based digital certificates that are encrypted using a hashing algorithm (as will be discussed in further detail with respect to FIG. 5). Smart contracts may be utilized by the ring network for the interactions. The ring signature 310 provides integrity of the digital property without compromising the identity of the ring network. The decentralization of the ring signatures 310 controls the system integrity.

As illustrated in blocks 406 and 408 in FIG. 4, and the authentication layer (e.g., cryptography, or the like) 320 of the security system environment 100, the security system 140 will identify anomalies in the authentication of the users and/or interactions (e.g., in the ring signatures identified for the requested interaction). For example, the authentication layer 320 utilizes checks to ensure that the received ring signature matches an anticipated ring signature. For example, a determination is made if the hexadecimal keys are not compromised. For example, any alteration in any key would results in a hexadecimal value that would not match the received hexadecimal value, and thus be flagged as an anomaly. It should be understood that the validation of the ring signature may be done in real-time using an iterative method to ensure any attempted security breaches are identified as the interaction requests are made.

As illustrated in block 410 of FIG. 4, and by the security breach detection engine 340 in FIG. 3, when anomalies in the authentication are identified (e.g., anomalies in the ring signatures do not match, or the like), the security system 140 analyzes metadata, and Security Orchestration and Response (SOR) information to detect when the interaction that has anomalies includes a fake signature key or compromised signature key protocols. The security breach detection engine 340 may include an interaction catalog of historical interactions for which the interaction information, digital properties, interaction anomalies, potential security breaches, entities, policies, decisioning, comments regarding the decisioning, metadata processing for the interaction, or the like are stored for any past interactions that were flagged with anomalies (e.g., in some embodiments, regardless of the anomalies were found to include security breaches or found to be without security breaches) in order to identify potential security breaches for the new interactions having anomalies. It should be understood that the security breach detection engine 340 may be pre-trained using AI/ML (e.g., as described with respect to FIG. 2) and the results of any analysis on new interactions may be stored for dynamically training the security breach detection engine 340 over time.

As illustrated by block 412 in FIG. 4 and the Ontology Generation Engine 350 in FIG. 3, the security system(s) 140 is used to create the ontology for the interaction, which will be illustrated in the mixed reality interface 380 that aids in allowing organization users 102 to decision the potential security breaches. The ontology generation engine 350 comprises graph enabled semantic transformers that are pre-trained to take appropriate action based on inputs by the security breach detection engine 340. The ontology generation engine 350 considers all the interaction information of the historical interactions, the inputs from the security breach detection engine 340 (e.g., analysis of current interactions), or the like to train the transformers in the event that potential security breaches are identified. When any new potential security breaches are identified, a dynamic graph ontology is determined for identifying an action path for the potential security beaches. The ontology generation engine 350 generates actionable node relationships between entities and/or digital property, and proposed actions for the foregoing in order to maintain an immersive interactive environment. The actionable node relationship is a dynamic self-evolving graph technology-based system with new node enablement for new potential security breach detection.

As illustrated in FIG. 3, the ontology generation engine 350 my include one or more centralized nodes, one or more immersive nodes linked to the one or more centralized nodes, one or more policy nodes linked to the one or more immersive nodes, and one or more action nodes linked to the one or more immersive nodes. The one or more centralized nodes comprise the one or more entities 352 or digital property (e.g., centralized device 356, centralized application 358, or the like) for the interaction 352. The one or more immersive nodes 360 comprise proposed actions for the one or more centralized nodes. The one or more policy nodes 362 (e.g., stored or new) comprise the response to the potential security breach. Moreover, the one or more actionable nodes 364 (e.g., decision nodes, such as approve, denied, recommended action, or the like) provides the decisioning for the potential security breach. It should be understood that as illustrated with respect to blocks 414 and 416 of FIG. 4, the policy determined for the potential security breach may be based on stored polices or the generation of a new policy. For example, as illustrated in block 414 the interaction ontology may determine a value that represents how closely the ontology is to a historical stored ontology. As such, when the value for the current ontology meets a threshold value for a stored ontology (e.g., 60, 70, 75, 80, 85, 90, 95, or the percentage, or the like), the policy identified may be the stored policy. However, as illustrated by block 416 when the determined value for the ontology is less than a threshold policy, a new policy may be created and suggested based on the potential security breach.

As illustrated in block 418 of FIG. 4, the security system 140 may generate a graphical interaction ontology for use in a mixed reality interface 380 based on the interaction ontology, the policy, and the decisioning for the potential security breach for the interaction. The mixed-reality interface 380 may be enabled to remote users through an edge gateway 370 that allows the users devices 110 (e.g., IoT devices, or the like) to access the mixed-reality interface 380 in a distributed cloud platform. The decentralized generation cloud platform (e.g., provided over a web3.0 decentralized cloud, or the like) of the mixed-reality interface 380 enables one or more users to take actions with respect to the ontology for the interaction at the same or different times.

As illustrated in block 420 in FIG. 4 and in the mixed-reality interface 380 illustrated in FIG. 5, users 102 may view the graphical interaction ontology within the mixed-reality interface 380. The mixed-reality interface 380 provides an actionable ecosystem that allows user(s) 102 (e.g., peer groups responsible to perform appropriate actions on the actional nodes) to take actions based on intelligent security breach catalog and cyber security breach intelligence enabled using a graphical model. The mixed-reality interface provides incoming data received from the ontology generation engine 350 through the gateway 370. The one or more users 102 (e.g., peer group, or the like) may comprise a decisioning user 386 (e.g., network admin, or the like) that validates the action performed and tracks the success/failure for future security breach detection defining the course of action for the security breach detection engine 340. Moreover, the one or more users 102 may include one or more reviewing users 381, 382, 383, 384 (e.g., actionable peers) that act on the security breach policies to enable the actionable nodes based on actionable policies defined by the decisioning user 386. These reviewing users may be interlinked to each other to form a close network for action verification in terms of hybrid policy node compliance for any action node enablement in the mixed reality ecosystem.

Consequently, the mixed-reality interface 380 allows a decisioning user 386 to review a policy identified by the ontology generation engine 350 (e.g., through AI/ML of the catalog of interactions) and presented to the decisioning user 386 in the mixed-reality interface 380, such as on the decisioning user's 386 computer device 110. Moreover, one or more reviewing users 381, 382, 384,383 have the ability to edit the policy generated by the ontology generation engine 350 in series or in parallel with the decisioning user 386 and update the policy or take another action by selecting the nodes within the mixed-reality interface 380. By taking an action with respect to the nodes, a notification may be sent to other users 102 (e.g., producer, owner, maintenance, or the like user) of the digital properties where the potential security breach has been detected to reduce the potential security breach (e.g., update and application, change configurations, isolate a device or application, implement security features, or the like) or update the stored policies so that new potential security breaches are decisioned automatically.

Block 424 of FIG. 4 illustrates that the interaction ontology, policy, and/or decisions are stored in the catalog of the security breach detection engine 340 to allow the AI/ML to update the determination of potential security breaches for future interaction anomalies.

As previously described herein, interaction requests and the ring signature 310 and authentication of the ring signature 310 may be implemented through the use of a blockchain. FIG. 5 is a block diagram illustrating the data structures within an exemplary distributed register for a blockchain, in accordance with some embodiments of the present disclosure. In particular, FIG. 5 depicts a plurality of blocks 500, 501 within the distributed register 542, in addition to a pending block 502 that has been submitted to be appended to the distributed register 542. The distributed register 542 may comprise a genesis block 500 that serves as the first block and origin for subsequent blocks in the distributed register 542. The genesis block 500, like all other blocks within the distributed register 542, comprise a block header 501 and block data 509. The genesis block data 509, or any other instances of block data within the distributed register 542 (or any other distributed register) may contain one or more data records. For instance, block data may comprise software source code, authentication data, interaction data (e.g., transaction data), documents, or other data containers, third party information, regulatory and/or legal data, or the like.

The genesis block header 501 may comprise various types of metadata regarding the genesis block data 509. In some embodiments, the block header 501 may comprise a genesis block root hash 503, which is a hash derived from an algorithm using the genesis block data 509 as inputs. In some embodiments, the genesis block root hash 503 may be a Merkle root hash, wherein the genesis block root hash 503 is calculated via a hash algorithm based on a combination of the hashes of each data record within the genesis block data 509. In this way, any changes to the data within the genesis block data 509 will result in a change in the genesis block root hash 503. In some embodiments, the block header 501 may include an interaction terminal identifier of a trusted interaction terminal that created the block (e.g., the identifier, in hash, as part of the root has 503, or the like). The genesis block header 501 may further comprise a genesis block timestamp 504 that indicates the time at which the block was written to the distributed register 542. In some embodiments, the timestamp may be a Unix timestamp. In some embodiments, particularly in registers utilizing a PoW consensus mechanism, the block header 501 may comprise a nonce value and a difficulty value. The nonce value may be a whole number value that, when combined with the other items of metadata within the block header 501 into a hash algorithm, produces a hash output that satisfies the difficulty level of the cryptographic puzzle as defined by the difficulty value. For instance, the consensus mechanism may require that the resulting hash of the block header 501 falls below a certain value threshold (e.g., the hash value must start with a certain number of zeroes, as defined by the difficulty value).

A subsequent block 501 may be appended to the genesis block 500 to serve as the next block in the linked block structure. Like all other blocks, the subsequent block 501 comprises a block header 511 and block data 519. Similarly, the block header 511 comprises a block root hash 513 of the data within the block data 519, a block timestamp 514, the interaction terminal identifier, or the like. The block header 511 may further comprise a previous block pointer 512, which may be a hash calculated by combining the hashes of the metadata (e.g., the genesis block root hash 503, genesis block timestamp 504, and the like) within the block header

501 of the genesis block 500. In this way, the block pointer 512 may be used to identify the previous block (e.g., the genesis block 500) in the distributed register 542, thereby creating a "chain" comprising the genesis block 500 and the subsequent block 501.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the register to pass the validation checks imposed by the consensus. Thus, the computational impracticability of altering data records in a ledger in turn greatly reduces the probability of improper alteration of data records.

A pending block 502 or "proposed block" may be submitted for addition to the distributed register 542. The pending block 502 may comprise a pending block header 521, which may comprise a pending block root hash 523, a previous block pointer 522 that points to the previous block 501, a pending block timestamp 524, pending block data 529, and/or an interaction terminal identifier (e.g., alone, as part of the root hash, or the like). Once a pending block 502 is submitted to the system, the nodes within the system may validate the pending block 502 via a consensus algorithm. The consensus algorithm may be, for instance, a proof of work mechanism, in which a node determines a nonce value that, when combined with a hash of the block header 511 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 511 is included in the pending block header 521 of the pending block 502 as the previous block pointer 522. The pending block header 521 may further comprise the pending block root hash 523 of the pending block data 529 which may be calculated based on the winning solution. The pending block 502 is subsequently considered to be appended to the previous block 501 and becomes a part of the distributed register 542. A pending block timestamp 524 may also be added to signify the time at which the pending block 502 is added to the distributed register 542.

In other embodiments, the consensus mechanism may be based on a total number of consensus inputs submitted by the nodes of the distributed register 542, e.g., a PBFT consensus mechanism. Once a threshold number of consensus inputs to validate the pending block 502 has been reached, the pending block 502 may be appended to the distributed register 542. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process. Alternatively, or in addition to the consensus described above, as discussed herein, the validation of an interaction (e.g., the consensus mechanism) may be based on the interaction terminal identifier that indicates that the interaction terminal is a trusted authority. Similar to the Proof-of-Authority mechanism, the interaction terminal identifier may include or may have attached a reputation value. However, it should be understood that the interaction terminal identifier may not require a reputation value. It should be understood that the interaction terminal identifier itself may indicate that it is a trusted authority for creating blocks on the distributed register.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device (otherwise described as a mobile computing system), such as a smartphone, tablet, single board computer, smart device, laptop, wearable device, or the like. In other embodiments, the computing system may be a stationary unit such as a personal desktop computer, networked terminal, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein, the term "user device", "user computer system", "mobile device", or "mobile computer system", may refer to mobile phones, personal computing devices, tablet computers, wearable devices, and/or any stationary or portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "lined block register," which may also be referred to as a "linked block ledger", may refer to a distributed register which uses linked block data structures. Generally, a linked block register is an "append only" register in which the data within each block within the linked block register may not be modified after the block is added to the linked block register; data may only be added in a new block to the end of the linked block register. In this way, the linked block register may provide a practically immutable register of data records over time.

"Permissioned distributed register", which may also be referred to as a "permission distributed ledger", as used herein may refer to a linked block register for which an access control mechanism is implemented such that only known, authorized users may take certain actions with respect to the linked block register (e.g., add new data records, participate in the consensus mechanism, or the like). Accordingly, "unpermissioned distributed register" as used herein may refer to a linked block register without an access control mechanism.

"Private distributed register", which may also be referred to as a "private distributed leger", as used herein may refer to a linked block register accessible only to users or devices that meet specific criteria (e.g., authorized users or devices of a certain entity or other organization). Accordingly, a "public distributed register", which may also be referred to as a "private distributed register", is a linked block register accessible by any member or device in the public realm.

"Consensus," as used herein may refer to the process or processes by which nodes come to an agreement with respect to the contents of the distributed register. Changes to the register (e.g., addition of data records) may require consensus to be reached by the nodes in order to become a part of the authentic version of the register. In this way, the consensus mechanism may ensure that each node, or a subset of the nodes, maintains a copy of the distributed register, or portions thereof, that is consistent with the copies of the distributed register, or portions thereof, hosted on the other nodes; if the copy of the distributed register, or portions thereof, hosted on one node becomes corrupted or compromised, the remaining nodes may use the consensus algorithm to determine the "true" version of the distributed register.

The "consensus" may a "consensus algorithm" otherwise described as a "consensus mechanism", such as proof-of-work ("PoW"), proof-of-stake ("PoS"), practical byzantine fault tolerance ("PBFT"), proof-of-authority ("PoA"), or the like. In some embodiments, the consensus requirement may be enhanced and/or replaced by one or more of a plurality interaction terminals that operate as nodes for the distributed register and/or can communicate with the distributed register. The interaction terminals may be automated teller machines ("ATMs"), cash recyclers, point-of-sale devices ("POS devices"), kiosks, or other like terminals within a single entity or owed by different entities. The one or more interaction terminals may be used to authenticate a user entering into an interaction, as well as may act as a trusted authority for validation of interactions (e.g., a piece of information within an interaction, the interaction itself, or the like). As such, the interaction may be validated on the distributed register without requiring PoW, PoS, and/or PoA consensus. The validation provided by the one or more interaction terminals relies on the trustworthiness of the entities operating the interaction terminals. As will be described herein, the interaction terminals may be registered (e.g., through interaction terminal identifiers) and can confirm interactions to improve the speed of interactions (e.g., does not require traditional consensus algorithms that take time), improves efficiency (e.g., the energy consumptions required by mining or other traditional consensus process is reduced), improves accuracy (e.g., terminals have built in authentication), or the like. In some embodiments the interaction terminals may be a node for the distributed register and/or communicate with nodes for the distributed register that perform traditional consensus.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed register, where the self-executing code may be executed when the condition precedent is detected by the system on which the smart contract is stored. The smart contracts may be utilized to allow for the interactions, the authorization of the interactions, and the validation on the distributed register to occur through the use of the interaction terminal and captured on the blockchain.

"Resource" as used herein may refer to tangible or intangible objects which may be held, owned, or used by a user and/or the entity. In this regard, examples of such resources may include electronic data files, documents, computing devices and/or other types of electronic hardware, physical objects, funds, financial instruments, computing resources, or the like. In some embodiments, a resource may be associated with one or more accounts (e.g., a user account). Accordingly, "resource transfer" or "resource transfer process" as used herein may refer to a transfer of resources from a resource origin to a resource destination, such as a data transfer, provisioning of hardware, transaction (e.g., funds transfer), or the like.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with real-time payment clearing and settlement.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for real-time payment clearing and settlement, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A security system for dynamic detection of potential security breaches, the system comprising:
one or more memory devices with computer-readable program code stored thereon; and
one or more processing devices operatively coupled to the one or more memory devices, wherein when executed the computer-readable program code is configured to cause the one or more processing devices to:
receive a plurality of interaction requests from a plurality of entities;
authenticate the plurality of interaction requests;
process authenticated interactions from the plurality of interaction requests when the authentication fails to detect anomalies in the plurality of interaction requests;
identify an abnormal interaction request from the plurality of interaction requests when the authentication identifies an anomaly;
analyze the abnormal interaction request as a potential security breach based on a catalog of a plurality of stored abnormal interaction requests, wherein the catalog of the plurality of stored abnormal interaction requests includes historical interaction information for the plurality of stored abnormal interaction requests and decisioning actions for policies for the plurality of stored abnormal interaction requests, and wherein analysis is performed using artificial intelligence and machine learning;

generate interaction ontology for the abnormal interaction request, wherein the interaction ontology comprises a map of nodes for the potential security breach;

identify a policy for the interaction ontology;

generate a graphical interaction ontology from the interaction ontology and the policy; and display the graphical interaction ontology to one or more users.

2. The system of claim 1, wherein the authentication of the plurality of interaction requests utilize cryptographic techniques that identify corrupted metadata, digital files, or validation protocols.

3. The system of claim 1, wherein the authentication of the plurality of interaction requests is based on using a ring signature for each of the plurality of interaction requests that is determined from the plurality of entities and interaction information for each of the plurality of interaction requests.

4. The system of claim 3, wherein the anomaly is an unauthorized ring signature that is a fake ring signature or has a compromised signature protocol.

5. The system of claim 1, wherein the map of nodes comprises:
one or more centralized nodes;
one or more immersive nodes linked to the one or more centralized nodes;
one or more policy nodes linked to the one or more immersive nodes; and
one or more action nodes linked to the one or more immersive nodes.

6. The system of claim 5, wherein the one or more centralized nodes comprise one or more entities or digital property for the abnormal interaction request.

7. The system of claim 5, wherein the one or more immersive nodes comprise proposed actions for the one or more centralized nodes.

8. The system of claim 5, wherein the one or more policy nodes comprise a response to the potential security breach.

9. The system of claim 5, wherein the one or more actionable nodes provide decisioning for the potential security breach.

10. The system of claim 1, wherein displaying the graphical interaction ontology to the one or more users comprising displaying the graphical interaction ontology in a mixed reality interface.

11. The system of claim 10, wherein the mixed reality interface is enabled through edge gateways.

12. The system of claim 10, wherein the mixed reality interface allows for connection of multiple internet of things devices of multiple users to allow the multiple users to decision the potential security breach in parallel.

13. A computer-implemented method for dynamic detection of potential security breaches, the computer-implemented method comprising:

receiving, by one or more processors, a plurality of interaction requests from a plurality of entities;

authenticating, by the one or more processors, the plurality of interaction requests;

processing, by the one or more processors, authenticated interactions from the plurality of interaction requests when the authentication fails to detect anomalies in the plurality of interaction requests;

identifying, by the one or more processors, an abnormal interaction request from the plurality of interaction requests when the authentication identifies an anomaly;

analyzing, by the one or more processors, the abnormal interaction request as a potential security breach based on a catalog of a plurality of stored abnormal interaction requests, wherein the catalog of the plurality of stored abnormal interaction requests includes historical interaction information for the plurality of stored abnormal interaction requests and decisioning actions for policies for the plurality of stored abnormal interaction requests, and wherein analysis is performed using artificial intelligence and machine learning;

generating, by the one or more processors, interaction ontology for the abnormal interaction request, wherein the interaction ontology comprises a map of nodes for the potential security breach;

identifying, by the one or more processors, a policy for the interaction ontology;

generating, by the one or more processors, a graphical interaction ontology from the interaction ontology and the policy; and displaying, by the one or more processors, the graphical interaction ontology to one or more users.

14. The method of claim 13, wherein the authentication of the plurality of interaction requests is based on using a ring signature for each of the plurality of interaction requests that is determined from the plurality of entities and interaction information for each of the plurality of interaction requests.

15. The method of claim 14, wherein the anomaly is an unauthorized ring signature that is a fake ring signature or has a compromised signature protocol.

16. The method of claim 14, wherein the map of nodes comprises:
one or more centralized nodes;
one or more immersive nodes linked to the one or more centralized nodes;
one or more policy nodes linked to the one or more immersive nodes; and
one or more action nodes linked to the one or more immersive nodes.

17. The method of claim 14, wherein displaying the graphical interaction ontology to one or more users comprising displaying the graphical interaction ontology in a mixed reality interface.

18. A computer program product for dynamic detection of potential security breaches, the computer program product comprising at least one non-transitory computer-readable medium having computer-readable program code portions embodied therein, the computer-readable program code portions comprising:

an executable portion configured to receive a plurality of interaction requests from a plurality of entities;

an executable portion configured to authenticate the plurality of interaction requests;

an executable portion configured to process authenticated interactions from the plurality of interaction requests when the authentication fails to detect anomalies in the plurality of interaction requests;

an executable portion configured to identify an abnormal interaction request from the plurality of interaction requests when the authentication identifies an anomaly;

an executable portion configured to analyze the abnormal interaction request as a potential security breach based on a catalog of a plurality of stored abnormal interaction requests, wherein the catalog of the plurality of stored abnormal interaction requests includes historical interaction information for the plurality of stored abnormal interaction requests and decisioning actions for policies for the plurality of stored abnormal interaction requests, and wherein analysis is performed using artificial intelligence and machine learning;

an executable portion configured to generate interaction ontology for the abnormal interaction request, wherein the interaction ontology comprises a map of nodes for the potential security breach;

an executable portion configured to identify a policy for the interaction ontology;

an executable portion configured to generate a graphical interaction ontology from the interaction ontology and the policy; and an executable portion configured to display the graphical interaction ontology to one or more users.

* * * * *